Dec. 18, 1923.

L. C. REED

SHOCK ABSORBER

Filed Feb. 8, 1923

1,477,976

Lester Charles Reed
INVENTOR.

BY
Knight Bros.
ATTORNEYS.

Patented Dec. 18, 1923.

1,477,976

UNITED STATES PATENT OFFICE.

LESTER C. REED, OF NEW YORK, N. Y., ASSIGNOR OF ONE-HALF TO FRANK J. FELDMAN, OF NEW YORK, N. Y.

SHOCK ABSORBER.

Application filed February 8, 1923. Serial No. 617,855.

*To all whom it may concern:*

Be it known that I, LESTER C. REED, a citizen of the United States, residing in the city, county, and State of New York, have invented certain new and useful Improvements in Shock Absorbers, of which the following is a specification.

My invention relates to shock absorbers such for example as are used between the chassis frame of an automobile and the axle.

The invention comprises a cylinder in which a piston reciprocates to cause a fluid in the cylinder to pass from one side to the other of the piston thru a by-pass, the by-pass being provided with adjustable means for restricting the flow of the fluid whereby the retarding effect that the fluid exerts upon the movements of the piston may be so adjusted as to give any desired damping. The invention further relates to means for connecting up the piston with the axle whereby the motion of the axle with respect to the frame of the machine would cause a corresponding motion of the piston with respect to the cylinder.

In the accompanying drawings:—

Figure 2:
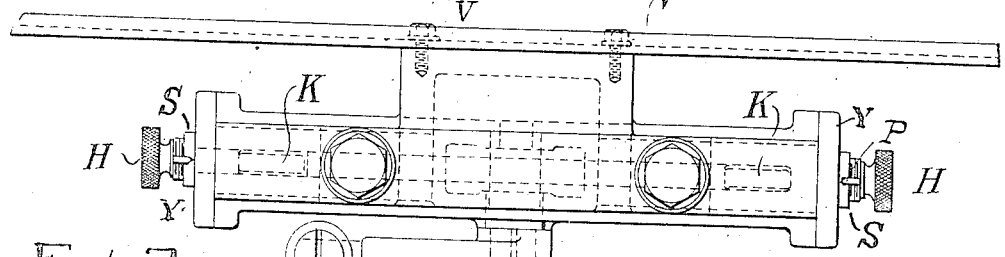
Figure 2 is a plan view.
Figure 1:
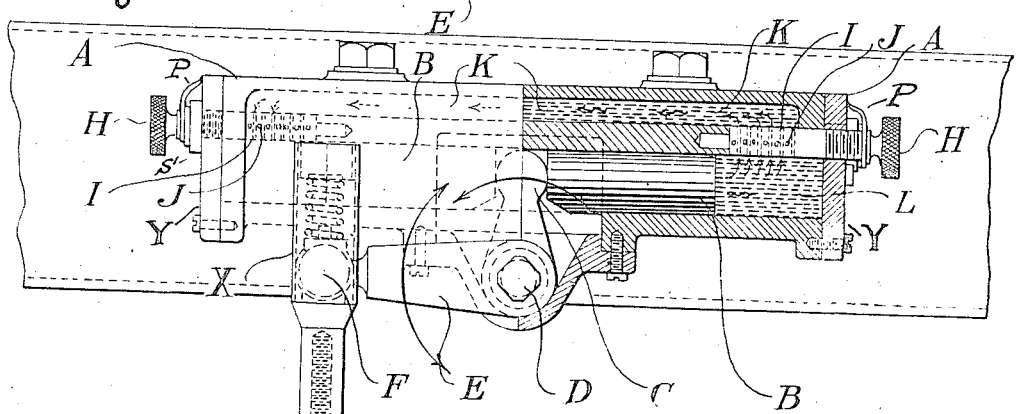
Figure 1 represents a side elevation of an embodiment of my invention with one-half of the cylinder shown in section.
Figure 1:
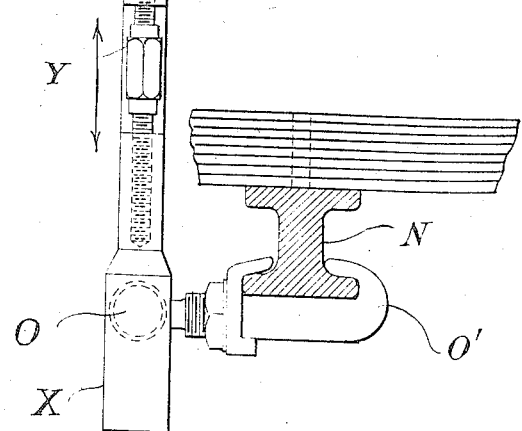
Figure 3:
Figure 3 is a section thru the regulating plug.

A represents a cylinder having a cylindrical bore in which plays a double ended piston B. The middle of the piston is notched as is shown and in this notch a cam arm C is inserted. The cam arm C is mounted on a rock shaft D, which on its outer end, outside of the cylinder casing carries a bell crank E having at its end a ball F, which engages with a ball socket X on the end of adjustable connecting rod Y and on the other end of the connecting rod a similar socket X engages with a ball O on the end of a clamp O' secured to the axle N. At H are shown knurl-headed screw plugs which snugly fit into drilled holes in the partition between the cylinder and a by-pass K and small holes I, J, which traverse the plugs, permit the passage of a non-freezing fluid L in the cylinder from one end to the other thru the by-pass. The holes I, J, may be at right angles as shown in Figure 1, so as to afford two different adjustments, one set of holes being larger than the other; or I may use three, four or more sets of holes of either different numbers or different sizes so that a different degree of retardation or damping may be obtained for each position that the plugs are set at. A pointer P, attached to the plugs H may indicate which holes are being used and a check nut S may be used to lock the plug in its set position. The cylinder may be secured to the frame by bolts as shown at V, V, Figure 2. The ends of the cylinder are closed by cylinder heads Y.

In operation it will be understood that any too violent relative motion between the frame of the machine to which the cylinder is secured and the axles or other member to which the other end of the connecting rod is attached will be opposed by the slowness of the passage of the fluid thru the respective holes in the plugs H in its effort to pass from the end of the cylinder under pressure to the end of the cylinder that is being relieved from pressure. The result of this will be that such sudden shocks will be absorbed in heating the fluid and thus the unpleasant jouncing of the car will be eliminated.

My invention may take other forms than that shown in the drawing and may be used for other purposes than for automobiles, but as such modifications will readily occur, to one skilled in the art it is not necessary to describe them herein.

I claim:

1. In a shock absorber the combination of a cylinder, a piston moving therein, a second cylinder and a second piston therein, a by-pass connecting the two cylinders, the two pistons mechanically connected together and articulated to the member whose shocks are to be absorbed and means located in the by-pass consisting of a rotatable plug provided with transverse orifices.

2. In a shock absorber designed to absorb the shock transmitted from one member to another comprising a cylinder attached to one of said members, said cylinder having a double ended piston reciprocating therein and a by-pass connecting the two ends of the cylinder, adjustable perforated plugs in said by-pass and articulated means for connecting the said piston to the other member.

3. In a shock absorber designed to absorb the shock transmitted from one member to another comprising a cylinder attached to one of said members, said cylinder having a double ended piston reciprocating therein and a by-pass connecting the two ends of the cylinder, adjustable perforated plugs in said by-pass and articulated means consisting of a bell crank and a connecting rod for connecting the said piston to the other member.

4. In a shock absorber designed to absorb the shock transmitted from one member to another comprising a cylinder attached to one of said members, said cylinder having a double ended piston reciprocating therein and a by-pass connecting the two ends of the cylinder, adjustable perforated plugs in said by-pass and articulated means consisting of a bell crank and a connecting rod with means for adjusting the length thereof for connecting the said piston to the other member.

LESTER C. REED.